Figure 1:
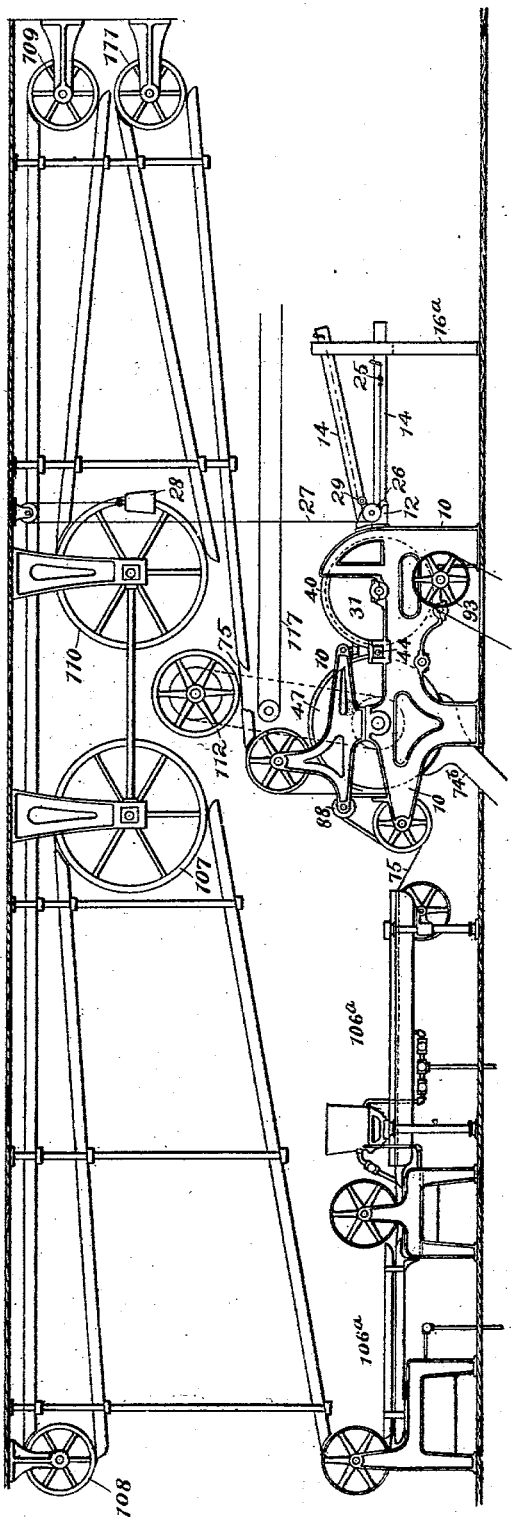

No. 716,810. Patented Dec. 23, 1902.
J. A. E. CRISWELL.
MACHINE FOR MAKING MATCHES.
(Application filed Dec. 15, 1900.)
(No Model.) 10 Sheets—Sheet 1.

WITNESSES:
INVENTOR

No. 716,810. Patented Dec. 23, 1902.
J. A. E. CRISWELL.
MACHINE FOR MAKING MATCHES.
(Application filed Dec. 15, 1900.)
(No Model.) 10 Sheets—Sheet 3.

Fig. 3ª.

WITNESSES:
H. W. Stanley
William Foster

INVENTOR
J. A. E. Criswell

No. 716,810. Patented Dec. 23, 1902.
J. A. E. CRISWELL.
MACHINE FOR MAKING MATCHES.
(Application filed Dec. 15, 1900.)
(No Model.) 10 Sheets—Sheet 4.
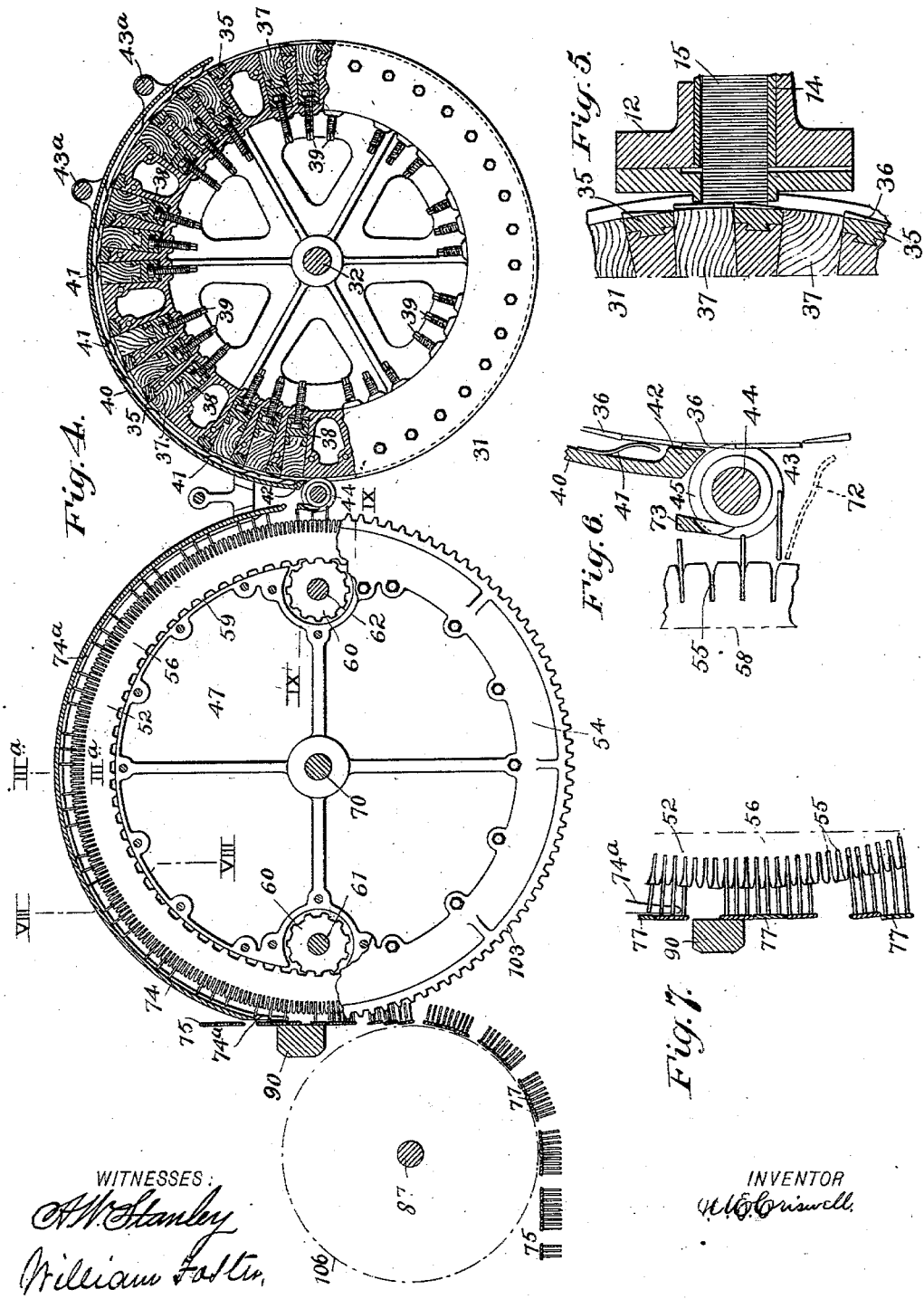
WITNESSES:
INVENTOR No. 716,810. Patented Dec. 23, 1902.
J. A. E. CRISWELL.
MACHINE FOR MAKING MATCHES.
(Application filed Dec. 15, 1900.)
(No Model.) 10 Sheets—Sheet 5.

WITNESSES:
A. W. Stanley
William Foster

INVENTOR
J. A. E. Criswell

No. 716,810. Patented Dec. 23, 1902.
J. A. E. CRISWELL.
MACHINE FOR MAKING MATCHES.
(Application filed Dec. 15, 1900.)
(No Model.) 10 Sheets—Sheet 6.
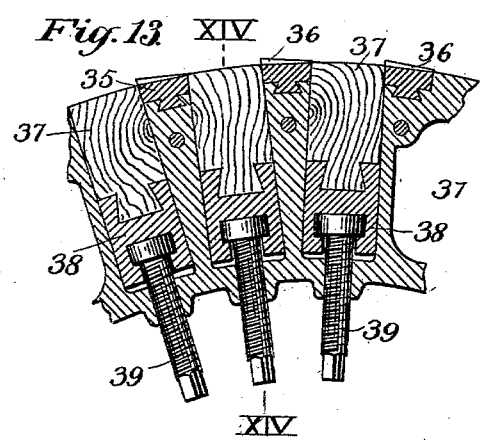
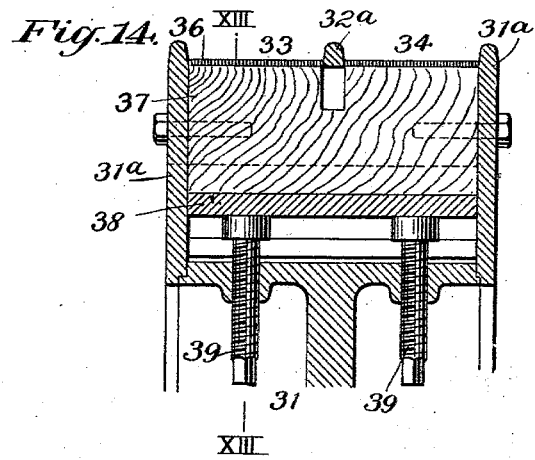
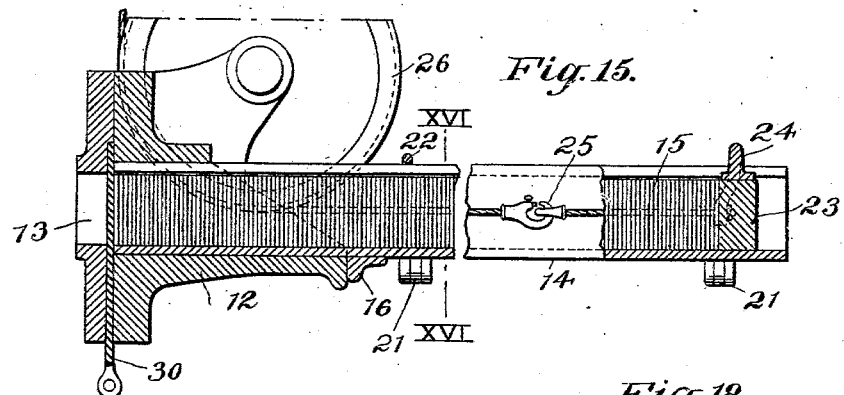
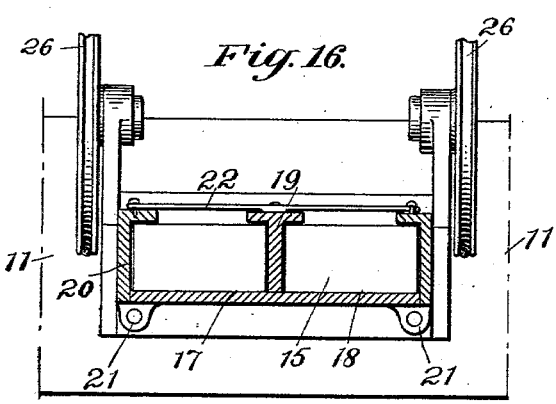
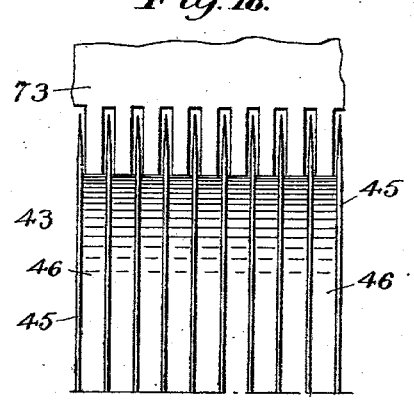
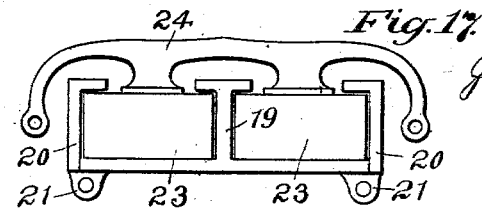
WITNESSES:
INVENTOR No. 716,810. Patented Dec. 23, 1902.
J. A. E. CRISWELL.
MACHINE FOR MAKING MATCHES.
(Application filed Dec. 15, 1900.)
(No Model.) 10 Sheets—Sheet 7.

WITNESSES:
F. W. Stanley
William Foster

INVENTOR
J. A. E. Criswell

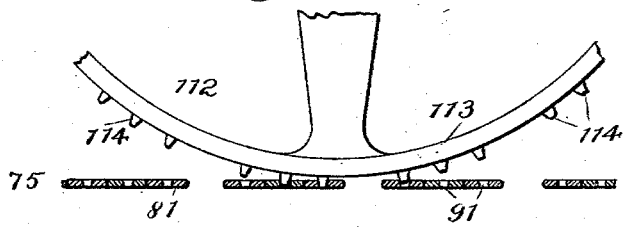
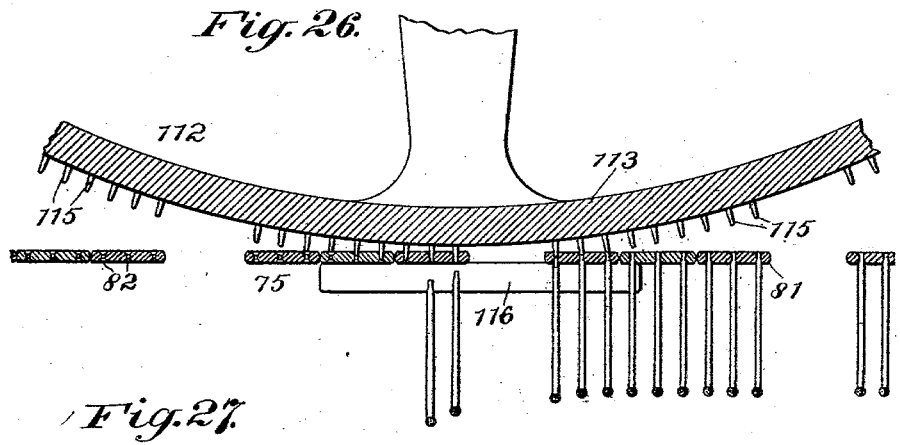
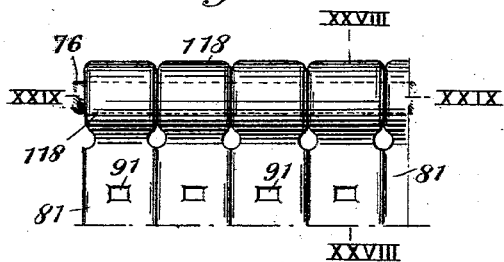
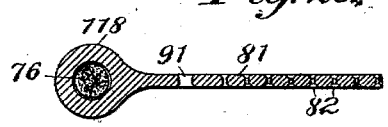
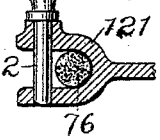
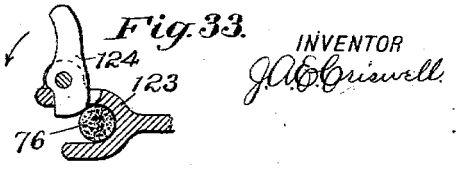

No. 716,810. Patented Dec. 23, 1902.
J. A. E. CRISWELL.
MACHINE FOR MAKING MATCHES.
(Application filed Dec. 15, 1900.)
(No Model.) 10 Sheets—Sheet 9.
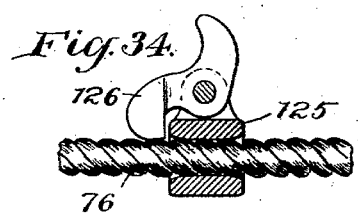
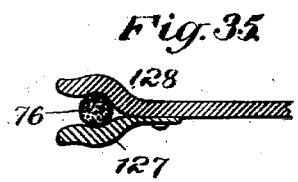
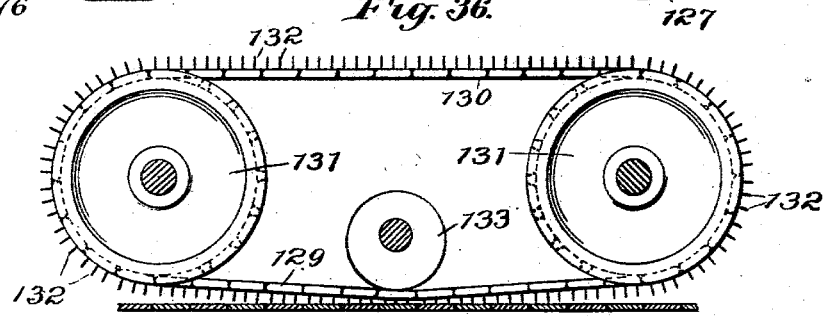
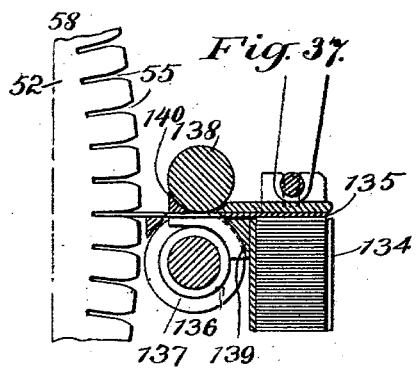
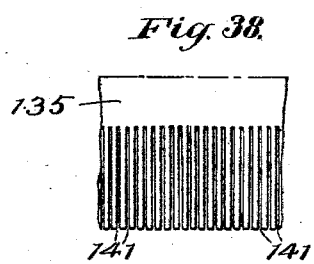
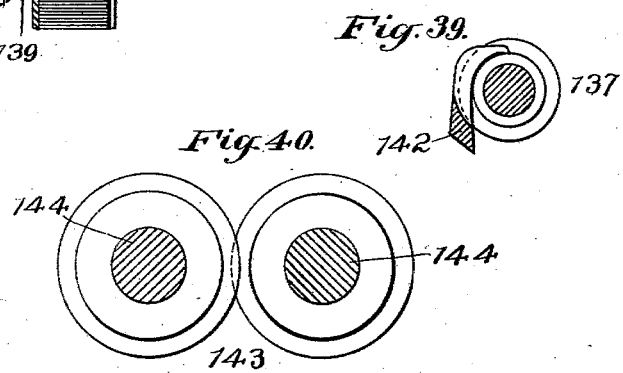
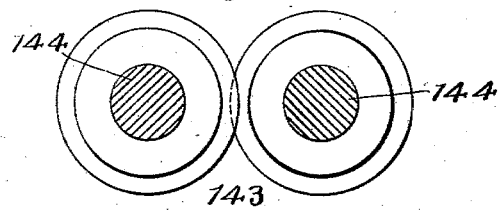
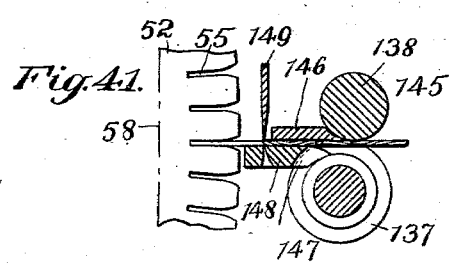
WITNESSES:
F. W. Stanley
William Foster
INVENTOR
J. A. E. Criswell No. 716,810. Patented Dec. 23, 1902.
J. A. E. CRISWELL.
MACHINE FOR MAKING MATCHES.
(Application filed Dec. 15, 1900.)
(No Model.) 10 Sheets—Sheet 10.
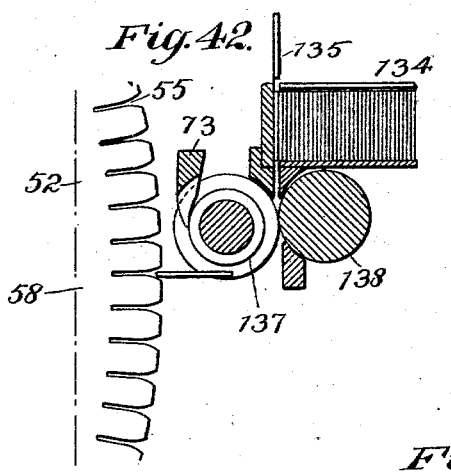
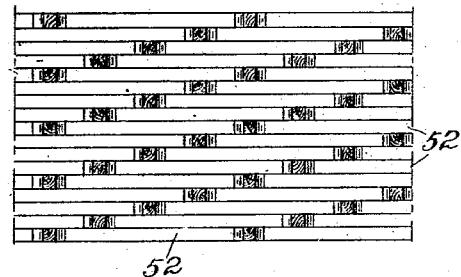
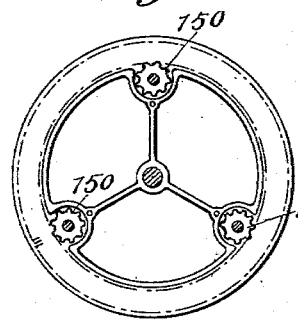
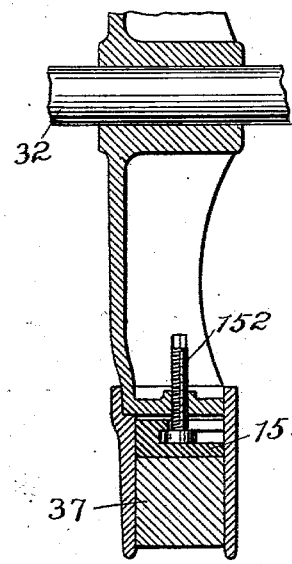
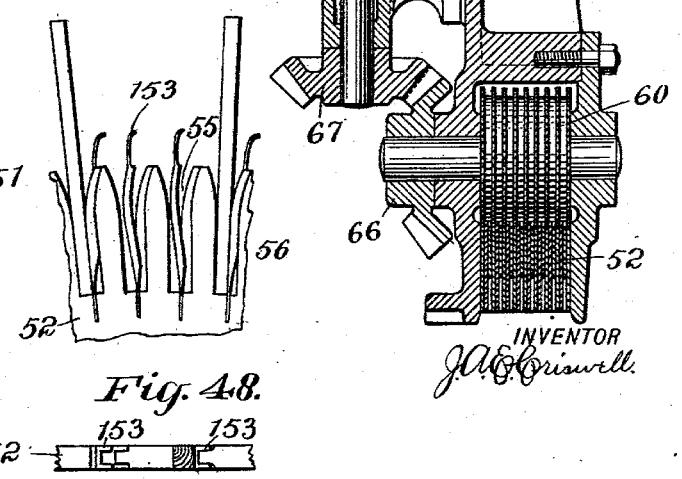
WITNESSES:
C. W. Stanley
William Foster
INVENTOR
J. A. E. Criswell

UNITED STATES PATENT OFFICE.

JAMES A. EKIN CRISWELL, OF NEW YORK, N. Y.

MACHINE FOR MAKING MATCHES.

SPECIFICATION forming part of Letters Patent No. 716,810, dated December 23, 1902.

Application filed December 15, 1900. Serial No. 40,001. (No model.)

*To all whom it may concern:*

Be it known that I, JAMES A. EKIN CRISWELL, of New York, county of Kings, and State of New York, have invented certain new and useful Improvements in Machines for Making Matches, of which the following is a full, clear, and exact description.

This invention relates to match-making machines, and more particularly to machines such as are disclosed in my application, Serial No. 737,186, filed November 16, 1899, in which the splints are cut from veneer.

The primary object of the invention is to provide simple and efficient means by which splints may be cut from veneer, separated, and then discharged into holding devices in such a manner that the splints will be under positive control from the time they are cut until they are held for completing the matches.

Another object of the invention is to provide a simple and efficient machine in which the parts acting to produce and hold the splints have a rotary motion and may be moved continuously, so as to produce means by which the machine may be run at any desired speed, and thereby materially increase the output of the machine and materially reduce the vibration and wear and tear of its parts.

Further objects are to provide a relatively slow moving machine with a very large output, to provide a simple and efficient plunger device, to provide a simple and efficient separator, and to provide a simple and efficient carrier and holding means for the splints.

With these and other objects in view the invention consists in the construction and combination of the parts, substantially as hereinafter described and then pointed out in the claims at the end of the description.

Figure 2:
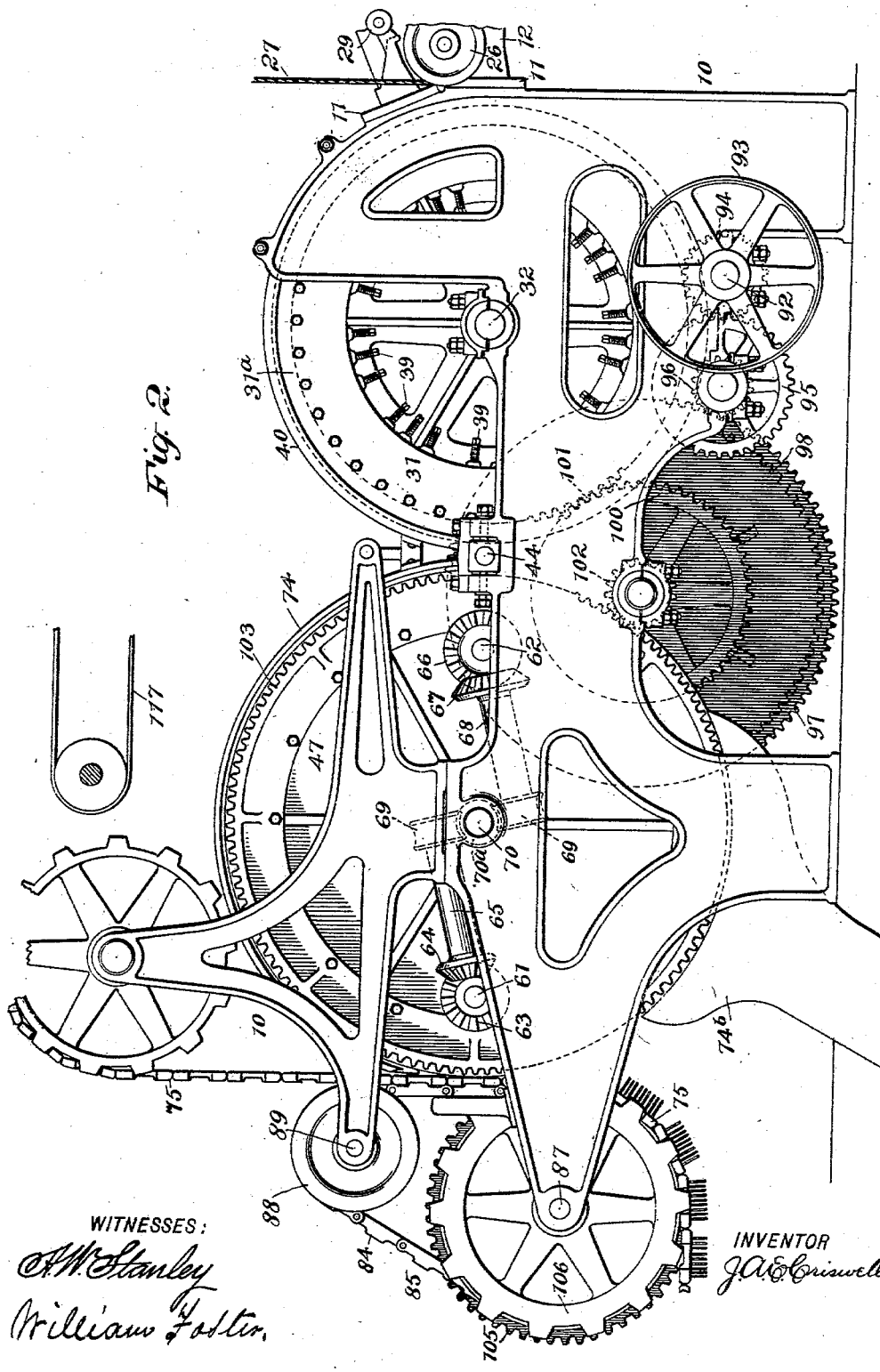
Figure 3:
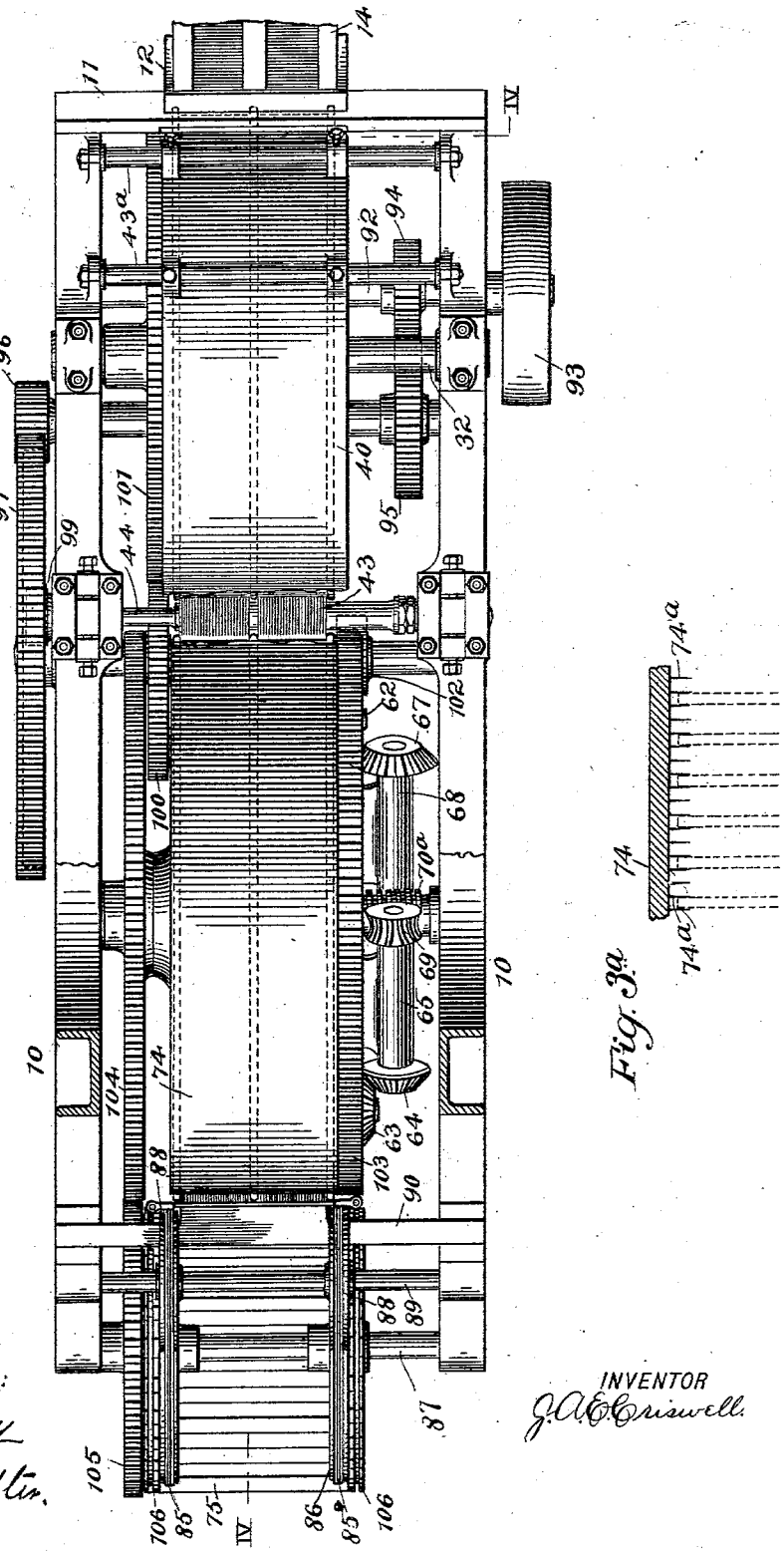
Figure 8:
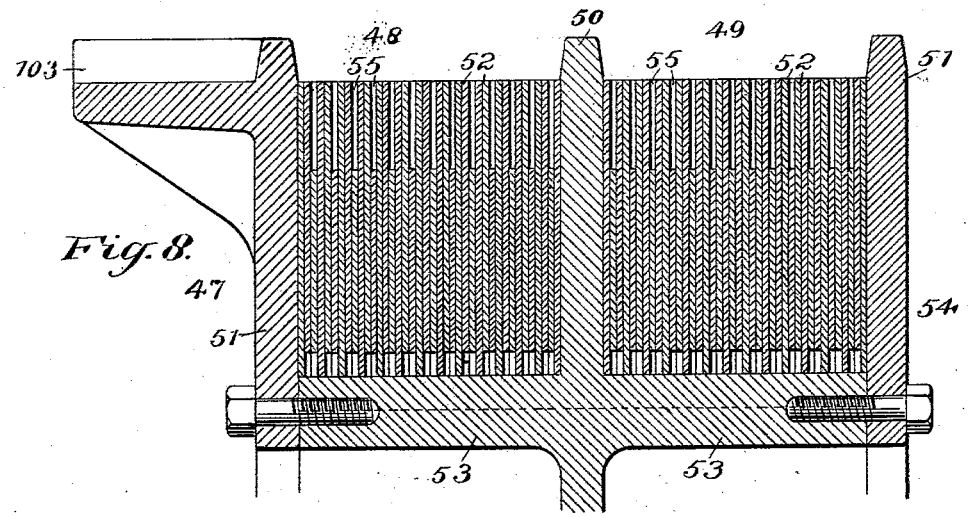
Figure 9:
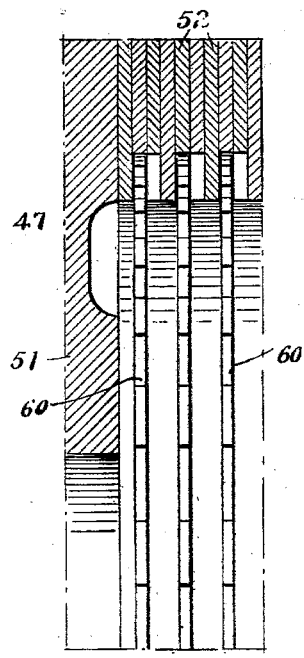
Figure 10:
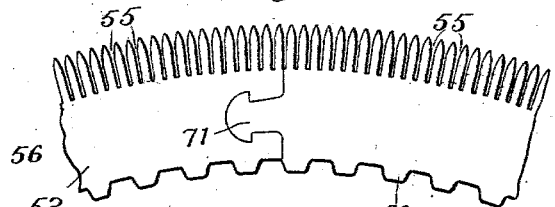
Figure 11:
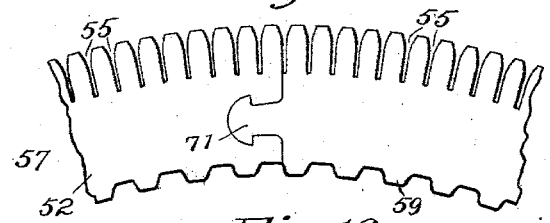
Figure 12:
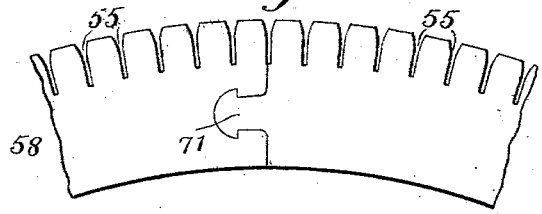
Figure 19:
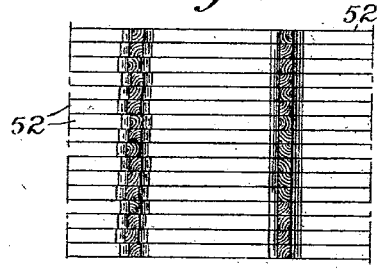
Figure 20:
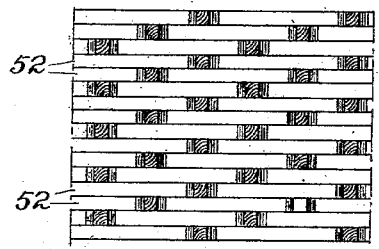
Figure 21:
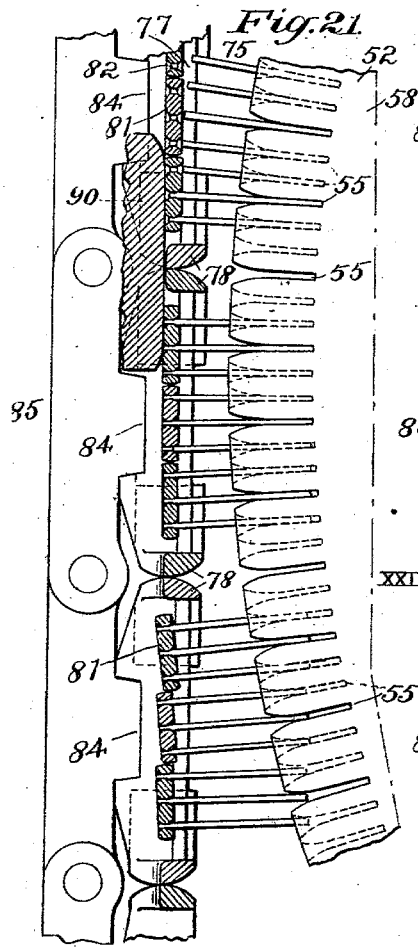
Figure 22:
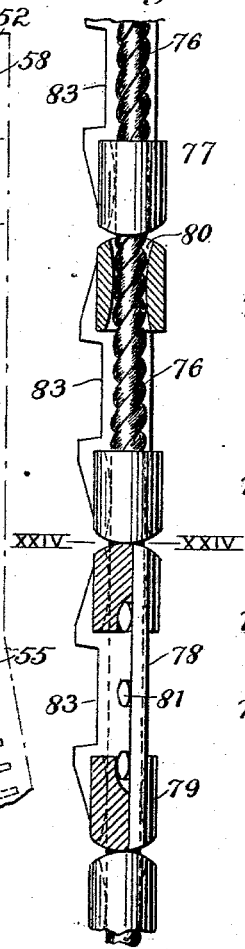
Figure 23:
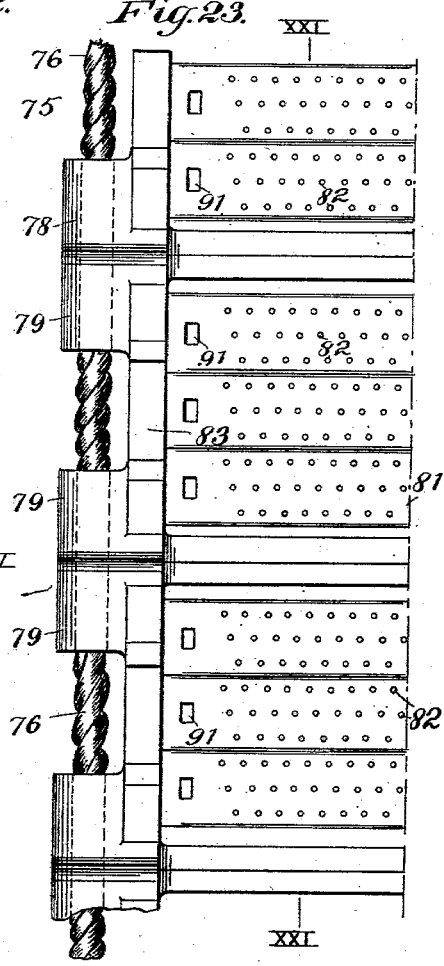
Figure 24:
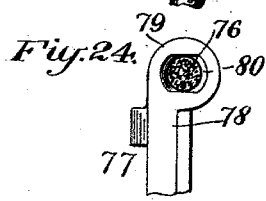

In the drawings, Figure 1 shows in elevation one form of machine embodying my invention and in elevation the devices for completing the matches. Fig. 2 is a side elevation of the machine on a larger scale. Fig. 3 is a plan view partly broken away. Fig. 3ª is a transverse section through the cover-plate, taken on the line IIIª IIIª of Fig. 4. Fig. 4 is a longitudinal section taken on the line IV IV of Fig. 3, the plunger device and the separator being each partly in section and partly in elevation. Fig. 5 is a fragmentary section, on a larger scale, showing how the cards or blanks are removed from the hopper or chute. Fig. 6 is a fragmentary section, on a larger scale and partly in elevation, showing how the cards are cut against the plunger device and transferred to the separator. Fig. 7 is a fragmentary portion of the machine, showing how the splints are transferred from the separator to the carrier. Fig. 8 is a fragmentary transverse section, on a much larger scale, taken through the separator on the line VIII VIII of Fig. 4. Fig. 9 is a fragmentary transverse section through the separator, taken on the line IX IX of Fig. 4. Figs. 10, 11, and 12 are fragmentary details of the separator plates or members. Fig. 13 is a fragmentary section through the plunger, taken on the line XIII XIII of Fig. 14. Fig. 14 is a transverse section through the plunger, taken on the line XIV XIV of Fig. 13. Fig. 15 is a longitudinal section through the card-hopper and the supporting-socket. Fig. 16 is a transverse section through the hopper, taken on the line XVI XVI of Fig. 15. Fig. 17 is an end elevation of the hopper or chute. Fig. 18 is a fragmentary elevation of the cutter-roll and stripping-comb. Fig. 19 is a fragmentary plan view of the separator, showing two lines of splints, one of which is in the position the splints are received, the other being slightly separated. Fig. 20 is a similar view of the separator, except that the splints are entirely separated into independent rows and in position to be forced into the carrier. Fig. 21 is an enlarged fragmentary longitudinal section through the carrier, taken on the line XXI XXI of Fig. 23, illustrating a portion of the separator and the endless chain, which assists in causing the holding devices of the carrier to register with the holding devices of the separator as the latter forces the splints into the carrier. Fig. 22 is a fragmentary side elevation, partly in section, of the carrier. Fig. 23 is a front elevation of a portion of the carrier. Fig. 24 is a transverse section through the cable, taken on the line XXIV XXIV of Fig. 22. Fig. 25 is a fragmentary view showing how the ejecting device or the various wheels or rotary parts which come in contact with the carrier may have teeth to enter recesses or openings in the splint-carrying devices. Fig. 26 is an enlarged fragmentary section of the carrier and ejecting-wheel. Fig. 27 is a plan view showing a slight extension of the form of carrier illustrated in the other views. Fig. 28 is a transverse section taken on the line XXVIII XXVIII of Fig. 27. Fig. 29 is a section along one of the cables, taken on the line XXIX XXIX of Fig. 27. Figs. 30 to 35 show various means for holding the splint-carrying devices to the cables or other flexible carriers. Fig. 36 is an endless belt provided with devices for ejecting the splints from the carrier. Fig. 37 is a longitudinal fragmentary section showing how the cards might be fed to the cutting means by a reciprocatory plunger and cut into splints and the splints then forced into the separator. Fig. 38 is an elevation of a portion of the plunger. Fig. 39 shows a slightly-different form of stripping device for the cutting-roll. Fig. 40 is a modified form of cutting device which may be used with some parts of the machine. Fig. 41 is a fragmentary view in section, showing how splints of the length of two or more of the usual size may be cut to form complete splints while held by the separator. Fig. 42 shows a different arrangement of the parts from that shown in Fig. 37 and shows how the cutter-roll may transfer the splints direct to the separator. Fig. 43 shows the arrangement of the splints when divided into four independent rows. Fig. 44 is an elevation of a separator, showing the arrangement of the gears for operating the three sets of movable members when the splints are to be divided into four independent rows. Fig. 45 is a fragmentary section of a rotary plunger which has only one division. Fig. 46 is a fragmentary section of a separator which has only one division; and Figs. 47 and 48 show in elevation and plan, respectively, a modified form of splint-retaining device.

The frame 10 of the machine may be of any suitable construction, and extending transversely of the frame in the front thereof is a bracket or bar 11. This bracket is provided with a socket-piece 12, through which is an opening 13. In the socket-piece and adapted to register with the opening 13 is removably held a hopper or chute 14, in which is placed the cards or blanks of veneer 15. The hopper has its bottom provided with a ledge 16, which rests against the forward end of the socket-piece 12, Fig. 15, and is adapted to be readily inserted and supported in said socket-piece, though when of considerable length its outer end may be supported by a standard 16ª, as shown in Fig. 1. The hopper 14 may consist of one or more divisions. As shown, there are two divisions 17 and 18, separated by a central partition 19. Each division has a side 20, which is hinged to the bottom of the hopper, as at 21, and is adapted to be swung downward to permit the cards to be readily inserted into the divisions. The sides, as well as the central partition 19, have ledges which fit over and above the cards 15 to retain them in the hopper. An arm or series of arms 22 are pivoted to the partition 19 and have hooked ends adapted to engage pins on the hinged sides 20, so as to hold the sides firmly in the position shown when engaging the pins or to permit the sides to swing on their hinges when the devices 22 are released. In each division is a follower 23, to which may be fastened a common yoke 24. The ends of the yoke extend outward and downward to about the longitudinal center of the chute or hopper, and to the ends of the yoke is fastened a rope or connection which may be quickly disconnected, as by a snap-hook 25. The connections pass around pulleys 26, located on the socket-piece, and from there lead to pulleys overhead and have weights 28 attached thereto, as in Fig. 1. The hopper may be variously constructed and held, and there may be provided more than one hopper, so that while the cards are being forced from one hopper the other may be taken away and filled. In this case the hoppers may be similarly constructed, and the bar or bracket 11 is provided with two socket-pieces, each similar to that already described. The upper socket-piece may have additional pulleys 29 to permit the same flexible connections to be employed, the latter passing around the pulleys, as indicated in dotted lines in Fig. 1, when the upper hopper is in use. In case of one or more hoppers being used each socket-piece may have a gate 30, which is adapted to prevent the cards passing through the opening 13 until the gate is withdrawn sufficient to give a free passage for the cards.

For the purpose of forcing the blanks or cards 15 out of the hopper or hoppers 14 any suitable means may be employed. The plunger device 31 is in the form of a drum or cylinder of sufficient size that its periphery for a distance equal to the length of the splints to be cut is practically a right line. The plunger has two side or retaining flanges 31ª and is fixed to a shaft 32, which is journaled in the frame, the periphery of the plunger being adapted to move close to the opening 13 in the socket-piece 12. The plunger may comprise one or more divisions, so as to adapt the machine to cut and handle one or more cards at the same time. As shown, it has a central flange 32ª, forming two divisions 33 and 34, corresponding in number to that of the hopper, said divisions being similarly constructed and operated. Around the periphery of the rotary plunger are a series of card-engaging devices 35, which are spaced apart a distance equal to at least the length of the cards. These card-engaging devices are fastened to the periphery of the drum or cylinder by dovetailing or in any other desired manner, and each engaging device has a projecting portion 36 of sufficient length that as it passes by the hopper or socket-piece in use it will force one of the cards out of the opening or chute 13 of the socket-piece. A cutting-block 37 is arranged in advance of each card-engaging device 35 and serves to support the card. Each block 37 may be of wood and is preferably held adjustable in the drum or cylinder of the plunger device, and each block may be secured to a slide 38. The slides 38 are each held in ways cut or formed in the plunger-cylinder, Figs. 4, 13, and 14, and have a slotted inner surface which is engaged by the heads of bolts 39 in such a manner that the latter may rotate. The stems of the bolts are screw-threaded and engage threaded apertures in the cylinder, so that as said bolts are rotated the slides 38 and blocks 37 are held in an adjusted position. The card-engaging devices 35 and the blocks 37 may be arranged in sets of three or any other suitable number for a purpose to be hereinafter explained, and fastened to a cap-plate 40 are a series of yielding fingers or springs 41, which are adapted to come in contact with the cards during the movement of the plunger and assist in retaining them in their proper position on the cutting-blocks and against the card-engaging devices 35. The inner end 42 of the cap-plate 40 is made to lie close to the plunger device, so that during the cutting action of the cutting device 43 the cards will be held so as to prevent them from tilting above the projecting portion 36 of the card-engaging devices 35 as the cutters of the device 43 begin to cut, the cap-plate 40 being suspended over the plunger by the tranverse rods 43ᵃ or in any other suitable manner.

Any suitable means may be employed for cutting the cards into splints. In the form shown a rotating shaft 44 has a series of circular cutters 45 arranged thereon. These cutters are beveled both ways, as shown in Fig. 18, and are spaced apart the proper distance equal to the width of the splints by the washers 46 and are adapted to cut the splints in a close row. The shaft or spindle of the cutters is suitably journaled in the frame 10, and said cutters are rigidly held to the spindle by lock-nuts or otherwise and are sufficient in number to cut the cards into the required number of splints. The cutters 45, as will be seen, cut the cards into splints against the blocks 37, and as the plunger and the cutters rotate the latter, owing to the friction between them and the splints, will remove the splints from the plunger device. The peripheral speed of the cutters and the plunger is about the same, and when this form of cutting device is employed and in case of others, if necessary, the projecting portions 36 of the card-engaging devices 35 are slotted to pass by the cutters 45 of the cutting device. It will be seen that as the plunger is rotated the card-engaging devices 35 will force the cards from the hopper or chute. The cards will rest against the blocks 37 and by means of the side flanges of the plunger and the yielding fingers 41 will hold the cards properly against the card-engaging devices until they are acted upon by the cutting device. Instead, however, of the cutters cutting against wooden blocks 37 the latter may be of any suitable material, whether of metal or combination of metal and a yielding material, as paper, rubber, or rawhide, or the cutters may cut against a metallic or other surface, whether adjustable or not, as found desirable.

The cutting device 43 after cutting the splints will transfer them from the rotary plunger 31 to a suitable separator, which may be variously constructed. The separator 47, which also serves to carry the splints, is in the form of a drum or wheel. As shown, it consists of two divisions 48 and 49, formed by the central flange 50 and the two outer flanges 51, though it may consist of only one or more than two divisions. The divisions and the parts comprising the same are similarly constructed, and each division has a series of slidable plates or members 52. These plates are circular or annular and rest upon the rim or web 53 of the wheel 54. The plates or members 52 are each provided with spaced slots, receivers, or holding devices 55, formed by making slots or teeth in the members, and said plates or members are arranged in sets corresponding to the number of rows into which the splints are to be divided. In the principal views there are three sets, though this number may vary. The receivers or holding devices 55 of all the sets of plates may be spaced apart alike and of a distance equal to the separation of the rows of splints, or each set may be spaced differently, as in Figs. 10, 11, and 12. The plates of one set, as 56, or every third plate of the division, is spaced the proper ultimate distance between two adjacent rows of splints, the next set, as 57, twice, and the third set, as 58, three times the distance, or that equal to the spacing between two cards of splints immediately after they enter the holding devices of the separator. The set 58 is by preference fixed to the drum or wheel and moves therewith, and the two other sets are so timed with respect to the movement of the set 58 that from the point where the splints enter the separator to where they are discharged or held for discharging one set, as 56, moves the distance between any two fully-separated rows of splints, and the second set, as 57, the distance between three fully-separated rows or two full spaces. To accomplish this, the movable members or sets 56 and 57—that is to say, movable independent of the drum or wheel—are provided with internal teeth 59. These teeth are engaged by gears 60, Figs. 4 and 9, secured to the shafts 61 and 62. The gears are arranged in sets, there being one set for each of the independently-movable sets of the separator, and said gears may be independent or may be cut or formed as a toothed roll. In any case the gears are so arranged and spaced apart as to engage only the teeth of its set, and the shafts of said gears are suitably journaled in the drum or wheel. On the shaft 61 is a bevel-gear 63, which is normally engaged by a bevel-gear 64, of smaller diameter, the shaft of which is journaled in a suitable bracket 65, carried by the drum of the separator. A bevel-gear 66 is secured to the shaft 62, which is in mesh with a similar gear 67, the shaft of which is journaled in a bracket 68, carried by the drum. The shafts of the gears 64 and 67 have each a worm-gear 69, which engages a stationary worm fixed to the stationary shaft 70, which latter also serves to support the drum of the separator. As the drum rotates the worm-gears 69 will be moved slowly by the worm $70^a$, and through said worm-gears 69, gears 64 and 65, and gears 66 and 67 the shafts 61 and 62 will be operated, and by means of the gears 60 each movable set of plates or members will be moved in a direction opposite to the direction of movement of the drum. The speeding and driving mechanism for the independent sets are so proportioned with respect to each other that one set, as that operated by the shaft 62, will move one-third again as fast in a predetermined distance as the set operated by the shaft 61 or the set 56, and instead of moving opposite to the drum they might move in the same direction. The plates or members are formed from a single piece or are made up of sections, as indicated at 71 in Figs. 10, 11, and 12, and the holding devices 55 of said plates are so spaced and the operating mechanism so timed that one device of every member will register to form a common groove or channel opposite the cutting device 43, into which channel they are forced in a close row and in a common plane, though the position and spacing of the splints will depend upon the means for supplying the splints to the separator. The separator receives the row of splints while still held by the cutting device, and to assist in aiding the splints to enter the holding devices 55 a guide or plate 72 (shown in dotted line in Fig. 6) may be arranged beneath the cutters, and to prevent the splints from being again withdrawn by the cutting device a stripping-comb 73 is arranged over the cutting device. The tines or teeth of the comb enter between each pair of cutters and strip the splints therefrom, and should one or more rows of splints for any reason not enter the holding devices the stripper 73 will remove the splints from the cutters, and said splints may then be removed by exhaust or other means to prevent interference with the splints following. The separator, as will be seen, is relatively large and is adapted to hold a number of rows of splints at the same time and to simultaneously act on them to separate them properly into independent rows, and as the separator rotates it carries the splints to the side and away from the cutting device and under a cover or plate 74. The plate 74 is supported in any desired manner on the frame and has pendent teeth or ribs $74^a$ to assist in keeping the splints in place, and particularly when the holding devices of the different sets register. The splints while under the plate or cover 74 and held may be subjected to blasts of air or other means (not shown) for removing any fiber or loose particles that might be carried along with the splints. One row or set of splints of each card—that is, one-third of them—will be held by the fixed members or plates 58, and the other two sets or rows of each card will be separated from the fixed set and from each other by the mechanism already described. As they reach a point at or about diametrically opposite the point the splints enter they will be properly separated into independent rows and in position to be held by a suitable carrier. If for any reason some of the splints should be broken or not held by the devices of the carrier, they will be removed by a pipe $74^b$, Figs. 1 and 2, which has its mouth flared and arranged close to the separator and its other end connected to an exhaust-fan, though such cleaning may be accomplished in any suitable manner. It will be seen that in the arrangement shown one set, as 56, of the plates will move the distance equal to the desired separation at each one-half revolution of the separator and the other movable set twice this distance in the same period and all the members rotate with the separator-drum. By this means the separator may have a large output while running at a comparatively slow speed, and the movable sets of plates or members have only a slight independent movement at each revolution of the separator.

To receive and hold the splints for completing the matches, the carrier or the holding means may be of any suitable construction. The carrier 75 (best shown in Figs. 21 to 24) comprises endless carrying devices 76, which are adapted to hold the splint-carrying devices 77. As shown, two endless cables are employed, along which the splint-carrying devices are strung. These splint-carrying devices comprise a frame 78, having lugs or projecting portions 79, through which are openings or eyes 80. The cables pass through these openings, so that the splint-carrying devices are strung along the same bead-like. These may be held to the cables or loosely supported thereon, and each frame has one or more strips or plates 81 held thereon. These may be secured to or formed as a part of the frame or, as shown, may have their ends pivoted to the frames, so as to extend transversely of the carrier. The pivoting ends of the plates are so formed that a limited rocking motion is permitted for a purpose to be hereinafter explained. Each strip or plate is provided with one or more rows of openings or holding devices 82, the number of rows usually being equal to that into which the original row or line of splints is divided. The holding devices 82 are spaced to agree with the spacing given the splints by the separator, and said holding devices are the usual small holes into which the ends of the splints are compressed and held. The frames 78 have recesses 83, which are adapted to be engaged by teeth 84 on the endless chains 85 or by other means, so as to cause the holding devices 82 to register at the point where the splints are received with the holding devices 55 of the separator members. These endless chains 85, or members of the same chain, pass around pulleys 86 on the shaft 87, Figs. 1, 2, and 3, and around pulleys 88 on the shaft 89. The endless chains may move the frames along the cables and allow the latter to move independently of the frames, and between the endless chains and extending transversely of the frame is a backing and thrust plate 90. The endless chains and the carrier move tangential to the separator and at the same speed, and as the holding devices 82 of the carrier come opposite the holding devices 55 of the separator the outer ends of the splints held in the separator will be forced into the holding devices 82. As the carrier continues to move, the plates or strips 81 will rock slightly to permit the splints to be withdrawn without loosening or bending the splints, as best shown in Figs. 7 and 21, though it will be understood that the holding devices of the carrier may be so constructed that the splints might be removed from the separator without bending or making them loose, in which case the strips or plates or other holding means need not be pivotally held. The strips or plates 81 may be further provided with openings 91, Fig. 23, to adapt teeth of rotating wheels or other devices to enter them where necessary or desirable to further assist in alining the plates. The carrier is thus made endless without hinging or linking the members together, yet permits the splint-carrying devices to be quickly adjusted, and at the same time the carrying devices are at all times held as a part of the endless carrier.

The frames 78 are constructed to hold three plates or strips 81, and the distance between the strips of any two adjacent rows is equal to one of said strips or that between four separated rows of splints. The plunger device is made with its engaging devices in sets corresponding in number to the number of plates in each frame of the carrier. It will be seen then that as the plunger rotates the engaging devices 35 will remove three cards from the hopper and then skip one, and as no card is forced to the cutting device no row of splints will be fed to the separator. This makes every fourth a blank and compensates for the space between any two adjacent frames, as no splints will be forced at this time into the carrier by the separator, though it will be understood that the number or whether there are any blanks will depend upon the carrier employed.

The speeding and timing mechanism, as well as the manner of operating the parts, may be of any desired construction. The main driving-shaft 92 has a pulley 93, and on said shaft is a pinion 94. This pinion meshes with a gear 95, and on the same shaft is a pinion 96. This pinion meshes with a gear-wheel 97, which also has internal teeth 98, that meshes with a pinion or small gear 99 on the cutter-shaft 44. On the same shaft as the gear 97 is a smaller gear 100, that meshes with a gear 101 on the plunger-shaft 32. A small gear 102 is on the same shaft as gears 97 and 100 and meshes with a gear 103 on the separator and by which the latter is rotated. Carried by the separator is a second gear 104, that meshes with a gear 105 on the shaft 87 of the endless alining-chains 85.

The carrier after receiving the splints passes around beneath the pulleys 106 over the heating and through the paraffining and composition devices 106ª of the usual or of any preferred construction to complete the matches. The carrier, with its matches, passes around the pulleys 107 and 108 to pulleys 109 and 110, then to pulleys 111, back to the ejecting device 112, though the carrier might be made to run in any other direction or in any suitable manner to permit the composition to set properly, as is usual. This ejecting device may be of any suitable form or construction. As shown, a wheel 113 is provided, Figs. 25 and 26, which has teeth 114, adapted to engage the openings 91 in the splint-carrying devices to be sure that the holding devices 82 of the carrier register with the ejecting pins or devices 115 on the wheel 113. These correspond in position and spacing to the holding devices of the carrier, and as the splint-carrying devices pass under the wheel the splints will be forced from the carrier, as best shown in Fig. 26, a projection or projections 116 being provided to assist in taking the thrust of the carrier-plates and to hold the latter against the wheel or in working position for the ejecting-pins. The ejecting device is supported above the machine in any desired manner and may be positively driven from a pulley on the separator, as indicated in dotted lines in Fig. 1. As the splints are ejected they may be made to fall upon an endless traveling belt 117 to be conveyed to box-filling machinery or to be handled, as desired.

The invention will be readily understood from the foregoing description when taken in connection with the accompanying drawings.

Assuming that either of the hoppers is filled with splint-cards, so as to have the inner card forced against the plunger device 31, and the machine started, it will be seen that the cards or blanks will be successively forced out of the hopper to the cutting device 43. The cutting device will cut the cards into splints against the plunger device and will transfer them as the cutters rotate from the plunger device and will force them into the grooves or channels in the separator formed by the registering of the holding devices of the separator plates or members, as already explained, and best shown in Fig. 19. The separator will carry the successive rows of splints to the side and past the cutting device, and as the separator rotates the splints will be separated into independent rows, as hereinbefore described, and will forcibly insert them into the holding devices of the carrier 75. The splints are then treated for completing the matches in the usual or in any preferred manner, and the completed matches after setting properly are ejected by the device 112, from which they are carried by the traveling belt or apron 117 to box-filling machinery or handled in any desired manner.

It will be seen from the foregoing that a relatively slow-moving machine with a large output is provided and that the parts of the machine may move continuously.

While I have shown the parts as applied to a special form of machine and in certain relations, it will be understood that some of the parts herein described may be used in connection with other forms of machines.

In Figs. 27 to 30 the frames of the splint-carrying devices are dispensed with. The plates or strips 81 have bosses 118, in which are openings or eyes through which the cable 76 or other traveling carrying devices pass. The plates are provided with the usual holding devices, and instead of being separated in sets, as when carried by the frames 78, they follow in succession and are strung bead-like on the cables 76. In this case the plates may be free to move on the cables to aline them and permit the splints to be received and removed from the separator properly, and when the plates follow in succession there are no blank spaces for cards to be skipped by the plunger.

The devices shown in Figs. 30 to 35 may be also applied to the frames 78 or to other forms of carriers or holding means for the splints.

In Fig. 30 the bosses have set-screws 119 for adjustably fastening the carrying devices to the cables, while in Fig. 31 the bosses are separate from the plate and are secured thereto by screws 120, bolts, or otherwise.

The boss 121 (shown in Fig. 32) is open for the reception of the cables, and passing through apertures in the boss is a retaining pin or bolt 122, which when in the position shown will retain the cable in the opening, but which if raised or removed will permit the removal of the cable.

The boss 123 of Fig. 33 is similar in form to boss 121, and to the boss is pivoted a retaining-lever 124. This lever has its inner end adapted to be swung out of the opening in the boss to permit the removal of the cable, but in the position shown retains the cable in the opening.

In Fig. 34 the boss 125 has a cam-lever 126 pivoted thereto, which is adapted to automatically grip the cable or may be freed to permit the devices to move independently of the cable.

The boss or bosses may have either or both jaws yielding. In Fig. 35 the lower jaw 127 of the boss 128 is yielding and may be of spring material. In this construction the cable may be withdrawn or inserted therein, and when inserted the splint-carrying devices will be frictionally held, so as to travel with the cables.

Only one side or end of the splint-carrying devices in Figs. 27 to 35 are shown; but the other ends are or may be similarly constructed, and in the construction shown in Figs. 32 to 35, inclusive, the cables may be automatically withdrawn and inserted to permit the cables and splint-carrying devices to move entirely independent of each other. Instead of traveling cables in any of these forms any other suitable means may be employed.

The sections of the wheel of the ejecting device 112, carrying the ejecting pins or devices, may be reciprocated to eject the splints as well as rotate, or simply reciprocatory ejecting devices may be employed, as is usual. In Fig. 36 is shown an endless belt 129, made up of sections 130. This belt passes around the wheels 131 and moves at the same speed as the splint-carrying devices, and on each section of the belt is a series of pins or devices 132, which are at the proper point given a sudden movement, as by the eccentric 133, to force the splints from the carrier-holding devices.

The splints may be supplied to the separator in various ways. As shown in Fig. 37, the cards are held in a hopper 134 and may be forced out of the hopper by a reciprocatory plunger 135 in a manner similar to that in my application hereinbefore referred to. The cards are forced to the cutting device 136. This cutting device comprises a roll of cutters 137, similar to that already described, and cuts the splints against a preferably metallic roll 138. A stripper or comb 139 prevents the splints from following the cutters, and a stripper 140 prevents the splints from following the roll 138. The plunger device is operated by any suitable means and preferably has a uniform speed corresponding to the speed of the cutter-roll, or said plunger device may yieldingly force the cards to the cutting device. The stroke of the plunger is sufficient to force the cards into the holding devices of the separator and is slotted to pass the cutters, as shown at 141 in Fig. 38.

The cutter-roll 137 instead of having the stripper or comb 139 arranged as in Fig. 37 may have a comb 142, as in Fig. 39.

The cutting device 143 has two parallel shafts 144, on each of which is a series of spaced cutters, the cutters of one roll being made to overlap the other. This cutting device may be used under certain conditions and particularly where the splints are to be separated into independent rows by the cutting device itself and then further separated.

Fig. 41 shows another means for supplying splints to the separator. The cutting device 145 is the same as in Fig. 37 and may be of the form shown in Fig. 40. A stripper or guide 146 prevents the splints from following the roll 138, and a comb or other device 147 prevents the splints from following the cutters. This device may be separate from or form a part of a table 148, and over the table is a suitable cutter 149. This cutter or knife may reciprocate over the table and is adapted to cut the long splints into shorter ones while held by the separator. The knife may enter a groove or opening in the table to prevent striking the latter, and the splints after being cut may be separated, as already described. In this form the separator and cutting device move intermittently or by a step-by-step movement, and in the other forms it may also move intermittently instead of continuously, though the manner of operating the parts may vary desired.

In Fig. 42 the construction of the hopper, plunger, and cutting device is substantially the same as in Fig. 37. The position of the separator is different and is located with respect to the cutter-roll substantially as in Figs. 4 and 6, so that the cutters will transfer and force the splints into the holding devices. In this and in the other views where a cutter-roll is used fingers or projections may travel with the cutters between them and so spaced as to prevent any backward movement of the splints.

The splints may be separated into any desired number of independent rows. In Fig. 43 the splints are divided into four rows, and in Fig. 44 is shown the arrangement for operating the movable sets of members. Like when divided into three sets, all the members might move, but, as in the separator described, there is one set fixed. In case the division is to be into four rows there will be three movable sets, and each set has its shaft of gears 150. These gears may be located as shown and may be operated as previously explained or otherwise, and the gears and operating mechanism are so timed that the sets of plates or members will separate the splints the proper distance.

Fig. 45 shows how the plunger device may have but one division. There is no central flange, and the slide 151 is open at one end and operated by a single bolt 150. Otherwise the plunger is substantially the same as already described.

The separator, as well as other parts of the machine, may consist of a single division or may comprise two or more independent divisions or members instead of one separator with divisions as a part thereof and the splints may be supplied in any desired way. In Fig. 46 the separator is substantially the same in construction as already described, except that it has only one division and handles the splints from single cards or blanks. In this case the separator may divide the splints into any suitable number of rows.

In Figs. 47 and 48 the set of plates 56 are each shown as provided with a spring 153 as a part of each holding device. The springs may be automatically forced back by engaging a suitable stop as the separator rotates, and at the point where the splints enter the holding devices the ends of the springs projecting beyond the plates for that purpose. The springs serve to close the holding-device openings not in use or those not holding splints and prevent the displacement of any of the splints of the other sets when the holding devices register with the set 56, as is the case at a certain point or points. These springs 153 may be used separately or in connection with the ribs or strips $74^a$ of the cover 74, or any suitable means may be employed for the same purpose.

While I have shown a particular kind of splint, these may vary, and by the word "veneer" it is intended to mean wood veneer or any material from which matches may be made.

The carrier on the splint-carrying devices thereof may be given a motion toward and from the separator to receive and remove the splints from the separator, and this movement may be very quick, or the separator or portions thereof may be so constructed as to be made to move toward and from the carrier to force the splints into said carrier similar to the action of a plunger, and then to move back free of the splints.

Additional moving means, as toothed wheels, may be made to assist in moving splint-carrying devices along the cables, and more particularly when the cables perform mainly or simply supporting and guiding means for the splint-carrying devices. Any or all the rotating wheels which work in connection with or adjacent to the split-carrying devices may have teeth to enter recesses therein for alining or other purposes, and all or any of said wheels or pulleys may be positively driven.

In this application, so far as the continuous feature is concerned, the claims are broadly to means whereby the splints after being cut are separated, while in my application Serial No. 41,818, filed January 2, 1901, continuous rotary or movable means in combination with other elements is broadly claimed; nor do I claim herein, broadly, simply independent or separable receivers, as such is claimed in my application Serial No. 52,005, filed March 20, 1901.

Having thus described my invention, what I claim as new, and desire to secure by Letters Patent, is—

1. A match-making machine, comprising splint-cutting means, rotary means for carrying a row or line of splints to the side of the cutting means at substantially right angles to the plane in which they are received and separating such row into a series of independent rows, and holding means receiving the separated splints direct from the separator.

2. A match-making machine, comprising splint-cutting means, a rotary separator moving the whole splint bodily at once and dividing the splints into a series of more than two independent rows, and holding means for the splints.

3. In a match-making machine, the combination with splint-cutting means, of a continuously-moving rotary separator moving the whole splint bodily at once and dividing the splints into a series of more than two independent rows, and holding means for the splints.

4. In a machine for making matches, the combination with a continuously-rotating separator moving the whole splint bodily at once which separates the splints into a series of more than two independent rows, of means for supplying splints to the separator, and holding means movable with and receiving the splints from the separator.

5. In a machine for making matches, the combination with splint-cutting means, of a continuously-moving rotary separator receiving the splints in a single row and carrying them to the side of the cutting means at substantially right angles to the plane in which they are received and separating the row into independent rows, and holding means for the splints.

6. In a machine for making matches, the combination with splint-cutting means, of a continuously-moving rotary separator moving the whole splint bodily at once and receiving the splints in a single row and carrying them to one side of the cutting means and separating them into more than two independent rows, and holding means for the splints.

7. In a machine for making matches, the combination with splint-cutting means, of a continuously-moving rotary separator receiving the splints endwise in a single row and carrying the row to the side of the cutting means and separating it into independent parallel rows, and a continuously-moving carrier moving in a plane tangential to the separator and receiving the splints endwise in independent rows direct from the separator.

8. In a match-making machine, the combination with means for supplying splints, of a rotary separator moving the splints bodily at once and dividing the splints into a series of more than two independent rows, and a carrier receiving the splints direct from the separator.

9. In a match-making machine, the combination with a splint-cutting device, of a movable separator located to one side of the cutting device and dividing the splints into independent rows, and a carrier movable in the same direction and at the same speed as the separator and receiving the splints in independent rows direct therefrom.

10. In a match-making machine, the combination with splint-cutting means, of a continuously-moving rotary separator receiving and holding the splints in a single row endwise and separating them into independent rows, means as an exhaust device for removing broken splints and the like from the separator, and a carrier receiving the splints from the separator.

11. In a match-making machine, the combination with splint-cutting means, of a separator having independently-movable members which separate the splints into independent rows, an exhaust device for removing fiber, dust and the like from the separator, and holding means for the splints.

12. The combination with a splint-cutting device, of a rotary separator comprising relatively movable and stationary members adapted to hold a number of rows of splints, and holding means for the splints.

13. A match-making machine, comprising means for supplying splints, of a rotary separator receiving the splints endwise and comprising independently-movable plates or members which separate the splints into a series of independent rows, and holding means for the splints.

14. In a match-making machine, the combination with splint-cutting means, of a rotary separator having independent slidable plates or members which separate the splints into independent rows, and holding means for the splints.

15. In a match-making machine, the combination with a splint-cutting device, of means for feeding blanks the length of the splints to the cutting device, a rotary separator having independent relatively movable and stationary members which separate the splints, and holding means receiving the splints from the separator for the purpose set forth.

16. The combination with a splint-cutting device of a plunger device for successively forcing blanks or cards to the cutting device, a rotary separator receiving the splints from the cutting device and separating them into independent rows and moving the rows, and a carrier movable in the same direction and at the same speed as that of the rows and receiving the independent rows of separated splints direct therefrom, substantially as described.

17. In a match-making machine, the combination with means for supplying splints, of a rotary separator receiving the splints in a common plane moving them bodily at once and separating them into more than two independent rows, and holding means for the splints.

18. In a match-making machine, the combination with means for supplying splints, of a rotary separator receiving the splints in a common plane moving them bodily at once and separating them into a series of more than two independent parallel rows, and holding means for the splints, substantially as and for the purpose set forth.

19. In a machine for making matches, the combination with a splint-cutting device having knives spaced apart and in operation cutting the splints in a close row, of a rotary separator dividing the splints into a series of more than two independent rows bodily at once, and holding means for the splints.

20. In a machine for making matches, the combination with means for supplying splints, of a rotary separator comprising relatively movable and stationary members receiving the splints in a common plane and separating them into independent rows, and holding means for the splints.

21. In a match-making machine, the combination with splint-cutting means cutting the splints in a close row, of a rotary separator comprising relatively movable and stationary members dividing the splints into independent rows, and holding means for the splints.

22. In a match-making machine, the combination with splint-cutting means cutting the splints in a close row, of a movable separator receiving successively a number of single rows of splints endwise from the cutting means and acting on them simultaneously to separate such rows into independent rows, and holding means for the splints.

23. The combination with a rotary plunger device, of a rotary separator which divides the splints into independent rows, a rotary cutter device which cuts the splints and transfers them from the plunger device to the separator, and a carrier receiving the splints from the separator all of which parts have a continuous motion for the purpose set forth.

24. In a machine for making matches, the combination with splint-cutting means, of rotary means receiving the splints endwise and carrying a row or line of splints to the side of the cutting means at substantially right angles to the plane in which they are received and separating the row into a series of independent rows, holding means receiving the separated splints endwise direct from the separator, and ejecting devices for forcing the splints from the holding means.

25. In a match-making machine, the combination with means for cutting splints into a single row, of means receiving the splints endwise and for carrying the single row of splints to the side of the cutting means and separating the row into a series of independent rows, a carrier receiving the independent rows of splints direct from the separator during the movement of the latter, and means for ejecting the splints from the carrier.

26. In a match-making machine, the combination with splint-cutting means, of a rotary separator dividing the splints into a series of more than two independent rows bodily at once, holding means for the splints, and ejecting devices for forcing the splints from the holding means.

27. In a match-making machine, the combination with splint-cutting means, of a continuously-moving rotary separator moving the splints bodily at once and dividing the splints into a series of more than two independent rows, a carrier receiving the splints direct from the separator, and ejecting devices for forcing the splints from the carrier.

28. In a match-making machine, the combination with splint-cutting means, of a continuously-moving rotary separator moving the splints bodily at once and dividing the splints into more than two independent rows, a carrier receiving the splints direct from the separator, means for completing the matches, and ejecting devices for forcing the splints from the carrier.

29. The combination with splint-cutting means, of a relatively slow-moving separator receiving a number of single rows of splints and acting on them at the same time to separate each row into independent rows, and holding means for the splints.

30. The combination with splint-cutting means, of a rotary separator receiving a number of single rows of splints endwise and acting on them simultaneously to separate such rows into independent rows, and a carrier receiving the separated splints from the separator.

31. In a match-making machine, the combination with splint-cutting means, of a moving separator receiving a number of single rows of splints and acting on them at the same time to separate each row into a series of more than two independent rows, and holding means for the splints.

32. In a match-making machine, the combination with splint-cutting means, of a relatively slow-moving separator receiving a number of single rows of splints endwise and acting on them simultaneously to separate such rows into more than two independent rows, and a carrier receiving the splints direct from the separator, substantially as and for the purpose described.

33. In a machine for making matches, the combination with splint-cutting means, of a rotary separator receiving a series of single rows of splints endwise and acting on them simultaneously to separate such rows into more than two independent rows, and a carrier receiving the separated splints from the separator.

34. The combination with splint-cutting means, of a moving separator receiving a number of single rows of splints and acting on them simultaneously to divide each row into independent rows, a carrier for the splints, together with ejecting means for forcing the splints from the carrier.

35. In a match-making machine, the combination with splint-cutting means, of a moving separator receiving a number of single rows of splints and acting on them simultaneously to divide each row into a series of more than two independent rows, a carrier receiving the splints from the separator, and ejecting devices for forcing the splints from the carrier.

36. In a match-making machine, the combination with splint-cutting means, of a relatively slow-moving rotary separator receiving a number of single rows of splints and acting on them simultaneously to divide each row into more than two independent rows, a carrier receiving the splints from the separator, and ejecting devices for forcing the splints from the carrier.

37. In a match-making machine, the combination with splint-cutting means, of a separator receiving a number of single rows of splints moving with the rows and acting on them simultaneously to divide each row into independent rows, and holding means for the splints.

38. In a match-making machine, the combination with means for supplying splints, of a separator receiving a number of single rows of splints moving with the rows and acting on them simultaneously to divide each row into more than two independent rows of splints, and holding means for the splints.

39. In a match-making machine, the combination with splint-cutting means, of a continuously-moving rotary separator receiving a number of single rows of splints and acting on them to divide each row into independent rows and moving with the rows, and a continuously-moving carrier moving in the same direction as the rows and receiving the splints in independent rows direct from the separator for the purpose set forth.

40. In a match-making machine, the combination with splint-cutting means, of a continuously-moving rotary separator receiving a number of single rows of splints and acting on them simultaneously to divide each row into more than two independent rows and moving the rows, and a continuously-moving carrier moving in the same direction and speed of the rows and receiving the splints from the separator.

41. In a match-making machine, the combination with means for supplying splints, of a movable separator receiving and holding a number of rows of splints and acting on them simultaneously to separate such rows into independent rows, and a carrier having holding devices into which the splints are forced by the separator.

42. The combination with a splint-cutting device, of a rotary separator comprising relatively movable and stationary plates which separate the splints into more than two independent rows, and holding means for the splints.

43. In a match-making machine, the combination with means for supplying splints, of a rotary separator having independent slidable plates or members which separate the splints into more than two independent rows, and a carrier receiving the splints from the separator.

44. In a match-making machine, the combination with a splint-cutting device, of means for feeding blanks the length of the splints to the cutting device, a rotary separator having relatively independent movable and stationary members which separate the splints into more than two independent rows, and a carrier receiving the splints from the separator.

45. The combination with a splint-cutting device, of a rotary plunger device for successively forcing blanks or cards to the cutting device, a rotary separator receiving the splints from the cutting device and separating them into more than two independent rows and moving the rows, and a carrier movable in the same direction at the same speed as the rows and receiving the independent rows of splints direct from said separator.

46. In a machine for making matches, the combination with means for supplying splints, of a rotary separator comprising relatively movable and stationary members receiving the splints in a common plane and separating them into more than two independent rows, and a carrier receiving the splints from the separator.

47. In a match-making machine, the combination with splint-cutting means cutting the splints in a close row, of a rotary separator comprising relatively movable and stationary members dividing the splints into more than two independent rows, and a carrier receiving the splints from the separator.

48. The combination with a rotary plunger device, of a rotary separator which divides the splints into more than two independent rows and moves the rows, a rotary cutting device which cuts the splints and transfers them from the plunger device to the separator, and a carrier movable in the same direction as the rows and receiving the splints endwise in independent rows from the separator all of which parts have a continuous motion for the purpose set forth.

49. The combination with a plunger device, of a separator which divides the splints into independent rows, a cutting device cutting the material into splints against the plunger device, and a carrier receiving the splints from the separator.

50. In a match-making machine, the combination with a plunger device, of a separator which divides the splints into more than two independent rows, a cutting device cutting the material into splints against the plunger device and transferring them to the separator, and holding means for the splints.

51. The combination with a rotary plunger device, of a rotary separator which divides the splints into more than two independent rows, a rotary cutting device cutting the material into splints against the plunger device and transferring them to the separator, and a carrier movable in the same direction and at the same speed as the separator and receiving the splints in independent rows direct from said separator.

52. In a match-making machine, the combination with a splint-cutting device, of a rotary plunger device for successively forcing blanks or cards to the cutting device, a rotary separator having independent slidable plates and separating the splints into independent rows, and holding means for the splints.

53. In a match-making machine, the combination with a splint-cutting device, of a rotary plunger device for successively forcing blanks or cards the length of the splints to the cutting device, a rotary separator having independent relatively movable and stationary members which separate the splints into independent rows, and holding means for the splints.

54. In a match-making machine, the combination with a rotary plunger device, of a separator comprising relatively movable and stationary members which divide the splints into independent rows, a cutting device cutting the splints against the plunger device and transferring them to the separator, and holding means for the splints.

55. The combination with a rotary plunger device, of a rotary separator comprising independent and relatively movable stationary members which divide the splints into independent rows, a rotary cutting device cutting the material into splints against the plunger device and transferring them to the separator, and a carrier movable in the same direction and at the same speed as the separator and receiving the independent rows of splints direct from said separator.

56. In a match-making machine, a hopper or holder for the splint-cards comprising a bottom, one or more partitions provided with suitable ledges, sides hinged to the bottom also provided with retaining-ledges, and means for holding the sides of the holder at substantially right angles to the bottom.

57. In a match-making machine, the combination with means for holding splint-cards, of a rotary plunger device having a series of peripheral card-engaging devices adapted each to force one of the cards from the holding means, adjustable supporting-blocks located between the engaging devices for holding the cards, and a device for cutting the cards into splints against the supporting-blocks of the plunger device.

58. In a machine for making matches, the combination with means for holding splint-cards, of a rotary plunger device having a series of slotted peripheral card-engaging devices adapted each to force one of the cards from the holding means, adjustable blocks located between the engaging devices, devices holding the blocks in an adjusted position, and means cutting the cards into splints against the supporting-blocks of the plunger.

59. In a match-making machine, a movable separator comprising relatively stationary and movable members each provided with spaced holding devices for the splints, and means for moving the movable members.

60. In a machine for making matches, a rotary separator having independent members each provided with spaced holding devices for the splints, and means for moving the members relatively to each other for the purpose set forth.

61. In a machine for making matches, a rotary separator and carrier for the splints having independent slidable plates each provided with spaced holding devices for the splints, and means carried by the separator for operating the slidable plates to separate the splints.

62. In a match-making machine, a rotary separator comprising independent circular plates adapted to receive splints, and means for moving the plates at different speeds to separate the splints into independent rows.

63. In a machine for making matches, the combination with means for supplying splints, of a movable separator comprising two or more divisions forming substantially independent separators, each being provided with movable members having spaced holding devices which receive the splints endwise, means for moving the members to separate the splints, and holding means for the splints.

64. In a machine for making matches, a separator having independent plates provided with splint-holding means and arranged to work in series or sets, and gears for moving the plates at different speeds to change the position of the holding means.

65. In a machine for making matches, the combination with means for supplying splints, of a movable separator comprising relatively stationary and movable members each provided with spaced holding devices to receive and hold the splints endwise, and means for moving the movable members to separate the splints into independent rows, and holding means for the splints.

66. In a machine for making matches, the combination with means for supplying splints, of a rotary drum or carrier having independent plates provided with devices to receive and hold the splints, and means for operating the plates in sets to separate the splints into independent rows, and holding means for the splints.

67. In a machine for making matches, the combination with means for supplying splints, of a rotary drum or carrier having independent plates or members arranged in sets one set of which is fixed to the drum or carrier each set of plates being provided with holding devices to receive and hold the splints endwise, and means for shifting the position of the sets of plates or members to separate the splints into independent rows.

68. In a machine for making matches, a movable separator comprising independent circular plates or members arranged in sets and each plate being provided with devices for receiving and holding splints, and means for moving the sets of plates at different speeds to divide the splints into more than two independent rows.

69. In a machine for making matches, a separator having independent plates each provided with splint-holding means and arranged to work in sets, and gears for moving the plates at different speeds to change the position of the holding means and separate the splints into more than two independent rows.

70. In a machine for making matches, the combination with means for supplying splints, of a rotary separator comprising relatively stationary and movable members provided with spaced holding devices to receive and hold the splints endwise, and means for moving the movable members to separate the splints into more than two independent rows, and holding means for the splints.

71. In a machine for making matches, the combination with means for supplying splints, of a rotary drum or carrier having independent plates provided with devices to receive and hold the splints, and means for operating the plates in sets to separate the splints into more than two independent rows, and holding means for the splints.

72. In a machine for making matches, the combination with means for supplying splints, of a movable separator comprising independent members or plates each provided with spaced holding devices receiving the splints endwise, and means for moving the members to cause a holding device in each member to register with those of the others at a predetermined point to provide a common entering channel or groove for a row of splints and as the members continue to move to divide the splints into independent rows, and holding means for the splints.

73. In a machine for making matches, the combination with means for supplying splints, of a movable separator comprising independent members or plates each provided with spaced holding devices for the splints, the members being arranged in sets, and means for moving the sets of members to cause a holding device in each member to register with those of the others at a predetermined point to provide a common entering channel or groove for successive rows of splints, and as the sets of members continue to move to divide the splints into more than two independent rows, and a carrier receiving the splints from the separator.

74. In a match-making machine, the combination with means for supplying splints, of a separator having independent plates or members provided with gear-teeth and having holding devices for the splints, gears for operating the members, and means carried by the separator to operate the gears and through the latter to move the members to divide the splints into independent rows, and holding means for the splints.

75. In a match-making machine, the combination with a suitable dipping-carrier, of movable means having devices for separating the splints into more than two independent rows bodily at once and which forcibly insert the rows of splints in the carrier by moving the devices toward the carrier.

76. In a match-making machine, the combination with a suitable carrier, of a rotary separator having means for dividing the splints into more than two independent rows bodily at once and which forcibly inserts the rows of splints into the carrier as the separator rotates.

77. In a match-making machine, the combination with splint-cutting means and a suitable carrier, of a movable separator dividing the splints into more than two independent rows and carrying such rows bodily and forcibly inserting the rows of splints into the carrier by the movement of the separator.

78. In a match-making machine, the combination with splint-cutting means and a suitable carrier, of a separator having independent members receiving the splints direct from the cutting means dividing the splints into independent rows bodily at once and carrying them to the side of and away from the cutting means and forcibly inserting them into the carrier.

79. In a match-making machine, the combination with splint-cutting means and a suitable carrier, of a rotary separator receiving the splints endwise dividing and carrying the splints bodily at once to the side of the cutting means and forcibly inserting independent rows of splints into the carrier.

80. In a match-making machine, the combination with splint-cutting means and a suitable carrier, of a rotary separator having independent plates separating and carrying the splints bodily at once to the side of the cutting means and forcibly inserting them into the carrier.

81. In a match-making machine, the combination with means for cutting splints, of rotary means separating the splints bodily at once and carrying them to the side of the cutting means, means for delivering the splints endwise to the rotary means and a dipping-carrier receiving the splints direct from the rotary means.

82. In a match-making machine, the combination with means for cutting splints, of a rotary separator dividing the splints into independent rows bodily at once, and carrying them to the side of the cutting means, means for delivering the splints endwise to the separator and a dipping-carrier receiving the splints direct from the separator.

83. In a match-making machine, the combination with means for cutting splints, of a rotary separator comprising two divisions each dividing the splints into independent rows bodily at once and carrying them to the side of the cutting means, means for delivering the splints endwise to the rotary means and holding means receiving the separated splints from both divisions of the separator.

84. In a match-making machine, the combination with splint-cutting means, of rotary means for carrying the splints to the side of the cutting means in the same direction but in different degree and holding them separated, means for removing particles from the separator, and a carrier receiving the splints from the separator.

85. In a match-making machine, the combination with splint-cutting means, of a movable separator dividing the splints into more than two independent rows, holding means for the splints, and exhausting means for removing any particles of dust or any splints that are not transferred to the holding means.

86. In a match-making machine, a carrier comprising a series of separate frames having openings or eyes in their ends, splint-holding devices pivotally held to the frames, and traveling cables passing through the eyes or openings of the frames and serving as a means to support and move the frames.

87. In a match-making machine, the combination with a series of separate splint-carrying devices each having means for holding one or more rows of splints, of traveling flexible carrying means along which the splint devices are strung, and means engaging the splint-carrying devices and moving them along the flexible carrying means independent thereof for the purpose set forth.

88. In a match-making machine, the combination with a carrier comprising a series of separate splint-carrying devices provided with openings in their ends and each having means for holding splints, traveling cables passing through the openings in the carrying means, and an endless chain engaging the splint-carrying devices and moving them along the cables independent thereof for the purpose set forth.

89. In a match-making machine, the combination with a splint-cutting device and means for feeding cards the length of the splints to the cutting device, of a rotary separator receiving the splints endwise and separating them bodily at once in right lines parallel to each other and into more than two independent rows, and a carrier receiving the splints from the separator, substantially as and for the purpose described.

90. In a match-making machine, the combination with a splint-cutting device, and means for feeding veneer cards the length of the splints to the cutting device, of a rotary separator into which the splints are forced endwise in a single row and which separates them in right lines parallel to each other bodily at once and into more than two independent rows, and holding means for the splints.

91. In a match-making machine, the combination with a splint-cutting device and means for feeding cards the length of the splints to the cutting device, of a rotary separator comprising relatively movable and stationary members receiving the splints endwise and separating them bodily at once in right lines parallel to each other and into more than two independent rows, and a carrier receiving the splints from the separator, substantially as and for the purpose described.

92. In a match-making machine, the combination with a splint-cutting device having knives or cutters spaced apart and cutting the splints in a close row, and means for feeding cards the length of the splints to the cutting device, of a rotary separator receiving the splints endwise and separating them bodily at once in right lines parallel to each other and into more than two independent rows, and a carrier receiving the splints from the separator.

93. The combination with a rotary plunger device, of a rotary separator receiving the splints endwise and which divides the splints bodily at once into more than two independent rows, a rotary cutter device which cuts the splints and transfers them from the plunger device to the separator, and a carrier receiving the splints from the separator all of which parts have a continuous motion, for the purpose set forth.

94. In a match-making machine, the combination with a rotary plunger device, of a rotary separator comprising relatively movable and stationary members receiving the splints endwise and which divides the splints bodily at once in right lines parallel to each other and into more than two independent rows, and a carrier receiving the splints from the separator all of which parts have a continuous motion, for the purpose set forth.

95. In a match-making machine, the combination with splint-cutting means, and means for feeding cards the length of the splints to the cutting means, of a rotary separator receiving a number of single rows of splints endwise and acting on them simultaneously to separate each row in right lines parallel to each other and into independent rows, and holding means for the splints.

96. In a match-making machine, the combination with splint-cutting means, and means for feeding splint material to the cutting means, of a movable separator receiving a number of single rows of splints endwise and acting on them simultaneously to separate each row in right lines parallel to each other and into more than two independent rows, and holding means for the splints.

97. In a match-making machine, the combination with a splint-cutting device having cutters spaced apart and cutting the splints in a close row, and means for feeding cards the length of the splints to the cutting means, of a rotary separator comprising relatively stationary and movable members receiving the splints endwise and separating them in right lines parallel to each other and into more than two independent rows, and a carrier receiving the splints from the separator.

98. In a machine for making matches, the combination with splint-cutting means, of a movable separator comprising independent members or plates arranged in independent sets and each provided with spaced holding devices receiving the splints in successive rows endwise direct from the cutting means, the spaced holding devices of each member being adapted to receive and hold an individual splint of different rows of splints successively fed thereto, means for moving the members relatively to each other to cause the holding devices in each member to successively register with those of the others at a predetermined point to provide successive common entering channels or grooves for rows of splints and as the members continue to move to divide the rows of splints into independent rows, and holding means for the splints.

99. In a machine for making matches, the combination with splint-cutting means, of a rotary separator comprising independent circular plates or members arranged in independent sets and each provided with spaced holding devices receiving the splints in successive rows endwise, the spaced holding devices of each member being adapted to receive and hold an individual splint of different rows of splints successively fed thereto, means for moving the members relatively to each other to cause the holding devices in each member to successively register with those of the others at a predetermined point to provide successive common entering channels or grooves for rows of splints and as the members continue to move to divide the splints into independent rows, and holding means for the splints.

100. In a match-making machine, the combination with a hopper adapted to hold splint-cards, of a plunger device for successively removing the cards from the hopper and carrying them bodily away from said hopper, a separator for the splints dividing the latter into independent rows, a cutting device cutting the cards into splints against the plunger device and which transfers the splints from the plunger to the separator, and a carrier receiving the splints from the separator.

101. In a match-making machine, the combination with a hopper adapted to hold splint-cards, of a rotary plunger device for successively removing the cards from the hopper and carrying them bodily away from the said hopper, a rotary separator for the splints dividing the latter into independent rows bodily at once, a cutting device cutting the splints against the plunger device and transferring them to the separator, and a carrier receiving the splints from the separator.

102. In a match-splint machine the combination of a splint-feed, a drum for receiving splints from said feed, said drum comprising a plurality of plates, each of which is provided with a plurality of slots or openings for holding splints and capable of being brought into a single alinement, and means for producing a relative movement between said plates to destroy the single alinement of the slots.

103. In a match-splint machine the combination of a splint-feed, a drum for receiving splints from said feed, said drum comprising a plurality of plates each of which has a plurality of splint-slots, some of which slots are so located in the plates as to be in alinement one with the other and the others of said slots separated one from the other and arranged in rows, means for producing relative movements between said plates at intervals to separate into rows those slots which are in alinement and to bring the separated slots into alinement one with the other.

104. In a match-splint machine, the combination of a splint-drum comprising a plurality of plates, each of which is provided with a plurality of splint-slots, some of said slots being arranged at times to be in alinement one with the other, and at other times separated one from the other, and others of said slots being separated at times one from the other and at other times in alinement one with the other, means for producing a relative movement of the plates to change the positions of the splint-slots, mechanism for feeding splints into the slots which are in alinement one with the other and other mechanism for removing splints from the slots which are separated one from the other, said mechanism being adapted to be operated simultaneously, and means for producing a rotary movement of the splint-drum.

105. In match-making machinery, the combination with means for supplying splints, of a plurality of revoluble separable splint-receivers each adapted to receive a single match-splint, means for delivering the splints each to its individual receiver, independently of any of the other of said receivers, and means for separating the said receivers.

106. In match-making machinery, the combination with splint-cutting means, of a rotary set of separable splint-receivers comprising three or more such receivers arranged in one series and adapted to receive splints from the cutting mechanism, and means for separating such receivers.

107. In match-making machinery, the combination with splint-cutting mechanism, of a set of separable splint-receivers comprising three or more such receivers arranged in one series and adapted to receive the splints from the cutting mechanism, means for separating such receivers, and a dipping-carrier movable in the same direction and at the same speed as the receivers and receiving the splints direct from the said receivers during the movement of both the receivers and the carrier.

108. In match-making machinery, the combination with splint-cutting means, of a series of continuously-moving separable splint-receivers receiving the splints endwise and carrying them to the side of the cutting means and separating the splints, and a continuously-moving dipping-carrier moving in a plane tangential to the receivers and receiving the splints endwise direct from said receivers.

109. In match-making machinery, the combination with splint-cutting means, of a plurality of revoluble separable splint-receivers each adapted to receive a single match-splint, means for delivering the splints each to its individual receiver independently of any of the other of said receivers, means for separating the said receivers, and a dipping-carrier moving in a plane tangential to the receivers and receiving the splints endwise in independent rows direct from the receivers and during the movement of the latter.

110. In match-making machinery, the combination with means for supplying splints, of a plurality of sets of separable splint-receivers each set comprising three or more such receivers arranged in one series and adapted to receive splints from the cutting mechanism, means for separating the said series of receivers, and a dipping-carrier movable tangential to the receivers and at the same speed as said receivers and into which carrier the splints are gradually forced endwise during the movement of the receivers.

111. In match-making machinery, the combination with means for supplying splints, of a rotary separator having devices or receivers for holding the splints and which moves the splints bodily at once, means for operating the receivers to separate the splints, said receivers being radially disposed, and a dipping-carrier receiving the splints from the receivers.

112. In match-making machinery, the combination of a series of more than two rotary separable receivers which move the splints bodily at once, means for delivering the splints endwise to the receivers, means for separating the receivers and thereby the splints, the said receivers being radially disposed and adapted to be brought into a single alinement which extends throughout the entire length of said receivers to permit the splints to be delivered thereto and to be received thereby in a single row, and a dipping-carrier receiving the splints from the receivers.

113. In match-making machinery, the combination with a series of more than two separable receivers having a closed inner end that forms an abutment for the splints, means for delivering the splints endwise to the receivers, means for separating the receivers and thereby the splints, and a dipping-carrier receiving the splints from the receivers.

114. In match-making machinery, the combination with a rotary separator moving the splints bodily at once and having a set of radially-disposed separable splint-receivers comprising three or more such receivers arranged in one series, the said receivers being closed at their inner ends to form an abutment for the splints, and adapted to be brought into a single alinement at the point where the splints are received, the said alinement extending throughout the entire length of the receivers in order to receive the splints in a single row and in a common plane, means for delivering the splints endwise to the receivers, means for separating the receivers and thereby the splints, and a dipping-carrier receiving the splints direct from the receivers.

J. A. EKIN CRISWELL.

Witnesses:
WILLIAM FOSTER,
A. W. STANLEY.